(12) United States Patent
Watson et al.

(10) Patent No.: US 10,085,431 B1
(45) Date of Patent: Oct. 2, 2018

(54) AQUARIUM AND NON-DISRUPTIVE FILTRATION SYSTEM

(71) Applicant: PetSmart Home Office, Inc., Phoenix, AZ (US)

(72) Inventors: Jeffrey Stocker Watson, Phoenix, AZ (US); Gary Steven Chattin, Phoenix, AZ (US); Lisa Beilke, Phoenix, AZ (US)

(73) Assignee: PetSmart Home Office, Inc., Phoenix, AZ (US)

( * ) Notice: Subject to any disclaimer, the term of this patent is extended or adjusted under 35 U.S.C. 154(b) by 0 days.

(21) Appl. No.: 15/475,921

(22) Filed: Mar. 31, 2017

(51) Int. Cl.

| A01K 63/04 | (2006.01) |
|---|---|
| B01D 29/05 | (2006.01) |
| C02F 1/00 | (2006.01) |
| B01D 35/26 | (2006.01) |
| A01K 63/00 | (2017.01) |
| A01K 63/06 | (2006.01) |
| B01D 29/92 | (2006.01) |
| C02F 103/20 | (2006.01) |

(52) U.S. Cl.
CPC .......... *A01K 63/045* (2013.01); *A01K 63/003* (2013.01); *A01K 63/047* (2013.01); *A01K 63/06* (2013.01); *B01D 29/05* (2013.01); *B01D 29/92* (2013.01); *B01D 35/26* (2013.01); *C02F 1/001* (2013.01); *C02F 2103/20* (2013.01)

(58) Field of Classification Search
CPC .... A01K 63/045; A01K 63/06; A01K 63/047; A01K 63/003; B01D 35/26; B01D 29/92; B01D 29/05; C02F 1/001; C02F 2103/20

USPC ...... 210/167.21, 167.23, 167.24, 232, 416.1, 210/416.2; 119/259
See application file for complete search history.

(56) References Cited

U.S. PATENT DOCUMENTS

| 5,139,659 A * | 8/1992 | Scott ................... A01K 63/042 119/261 |
|---|---|---|
| 7,785,476 B2 * | 8/2010 | Newman .............. A01K 63/045 119/263 |
| 2003/0116489 A1 * | 6/2003 | Terato .................. A01K 63/045 210/167.21 |
| 2012/0181222 A1 * | 7/2012 | Sherman .............. A01K 63/006 210/138 |

FOREIGN PATENT DOCUMENTS

FR          3031100 A1 *  7/2016

* cited by examiner

*Primary Examiner* — Fred Prince
(74) *Attorney, Agent, or Firm* — Duane Morris LLP

(57) ABSTRACT

The disclosed embodiments include an aquarium having a low-current filtration system. In one aspect, an apparatus includes a tank having a closed end and an open end, a base that receives and supports the closed end, and a lid removably positioned over the open end. The apparatus also includes a filter base disposed onto an interior surface of the closed end, and a filter housing that engages a housing support structure disposed onto the filter base. The filter housing includes a filter cartridge separating a first chamber from a second chamber, a pump disposed within the second chamber, and a reservoir disposed within the second chamber at a distal end of the filter housing. The reservoir includes an outlet structure having multiple discharge locations, and is connected to the pump across an elongated tube.

20 Claims, 7 Drawing Sheets

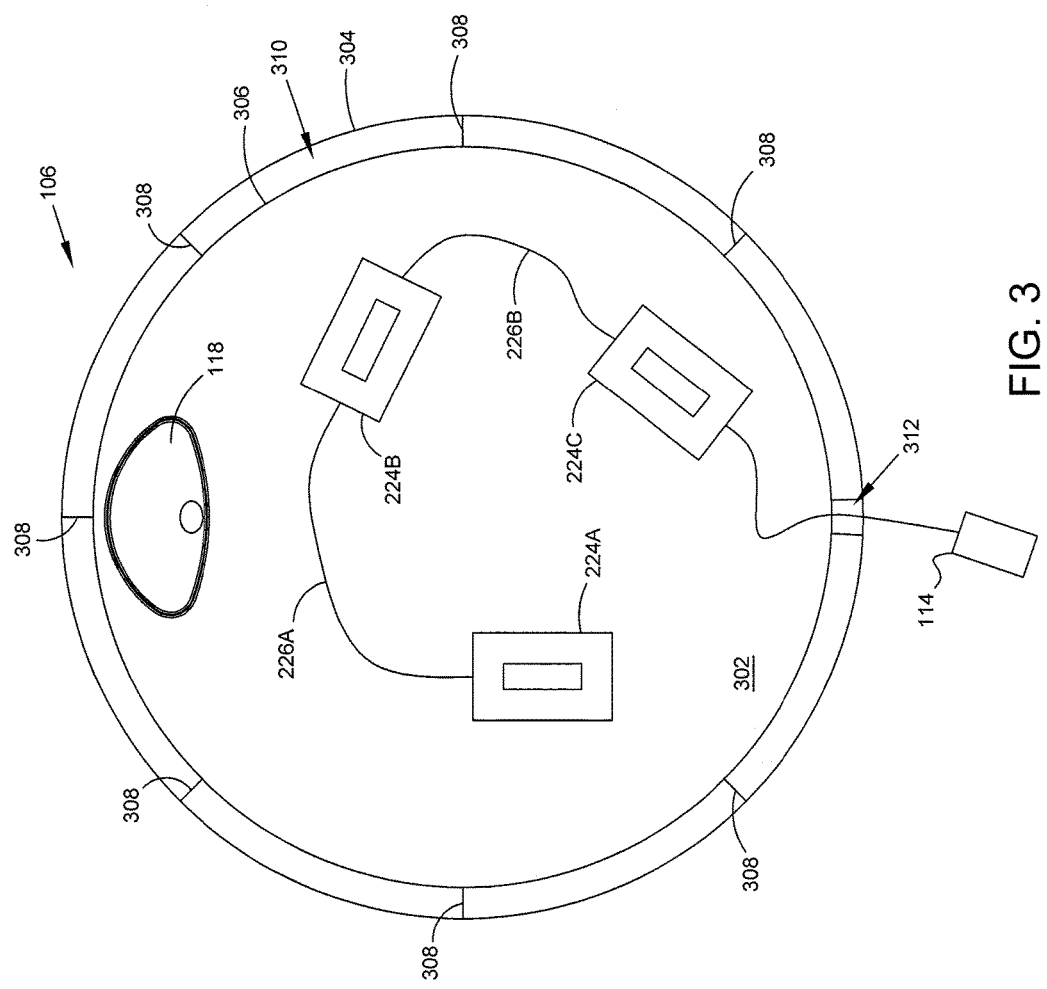

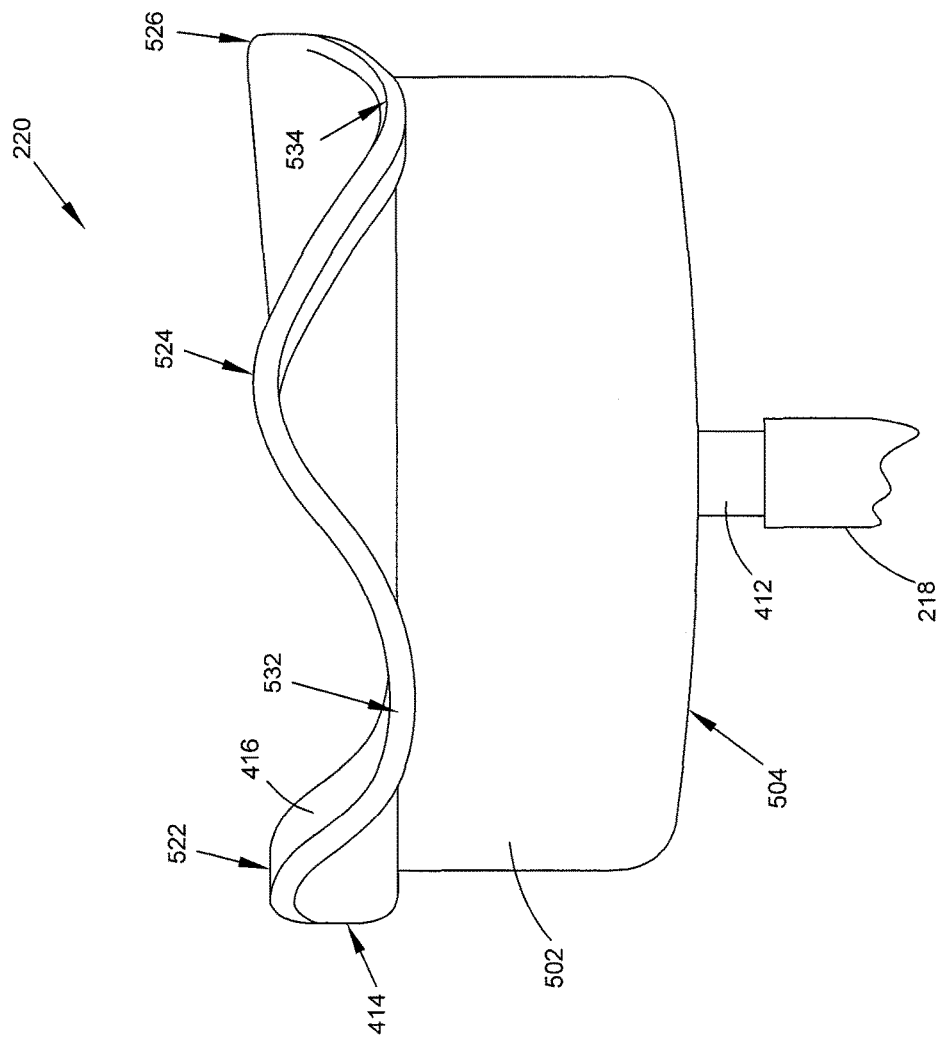

AQUARIUM AND NON-DISRUPTIVE FILTRATION SYSTEM

BACKGROUND

Aquariums housing aquatic life provide an aesthetically pleasing, relaxing display of motion and color that promote a viewer's curiosity and interest. Certain aquatic life, including species of fish commonly housed in aquariums, thrive in aquatic environments characterized by minimal hydrodynamic current and fluid motion. Nonetheless, aquarium maintenance, including proper water filtration and circulation, is essential to establishing a healthy aquatic environment for these fish species. Many conventional aquarium filtration systems face challenges in balancing the demands of proper water filtration and circulation with the desired fluid-dynamic characteristics of the aquatic environment.

SUMMARY

In an embodiment, an apparatus includes B tank having a closed end and an open end, a filter base dimensioned to be removably positioned over an interior surface of the closed end, and a filter housing having a proximal end dimensioned to removably receive the housing support structure. In one aspect, the filter base includes inlets and a housing support structure. The apparatus also includes a filter cartridge is disposed within the filter housing and separating a first chamber of the filter housing from a second chamber of the filter housing. The apparatus further includes a pump disposed within the second chamber of the filter housing, and including an input in fluid communication with the second chamber, and an output connected to a proximal end of an elongated tube. A reservoir is dimensioned to be removably positioned within the second chamber at a distal end of the filter housing, and the reservoir is connected to a distal end of the elongated tube and including an outlet structure. In some aspects, the pump operates to mechanically draw water from the tank through the inlets, into the first chamber through an opening in the housing support structure, and across the filter cartridge into the second chamber. The pump also operates to mechanically pump the drawn water through the elongated tube and into the reservoir, and the reservoir discharges die pumped water into the tank through the outlet structure.

In certain aspects, the tank is a cylindrical tank having a circular cross section, and the filter base is a circular filter base, and the inlets are disposed at corresponding angular positions along a surface of the circular filter base and elongated in a radial direction across the surface of the circular filter base. Additionally, in some aspects, the interior surface of the closed end includes a circumferential groove dimensioned to removably receive and support a circumferential edge of the circular filter base.

In other aspects, the pumped water discharges through the outlet at a constant flow rate. Additionally, or alternatively, the pumped water discharges through the outlet at a flow rate of twenty gallons per hour.

The distal end of the filter housing also includes a surface oriented perpendicular to an axis of the tank, and the outlet structure includes a discharge lip having a curved surface, the curved surface of the discharge lip contacting the surface of the distal end at corresponding discharge locations. The pumped water fills the reservoir and discharges across the discharge lip at the corresponding discharge locations and, when measured along the axis of the tank, the discharge lip of the reservoir is disposed at a position above a surface of the stored water.

In additional aspects, the filter housing is dimensioned to removably receive and support the pump within the second chamber at the proximal end of the filter housing, and the filter housing is dimensioned to removably receive and support the filter cartridge. Further, the apparatus includes a lid dimensioned to removably receive the open end of the tank. In some instances, the lid includes an aperture and an aperture cover. The apparatus also includes a lighting unit disposed on an interior surface of the lid, the lighting unit including a lighting element that emits light illuminating the interior of the tank. In other aspects, the apparatus includes a base dimensioned to removably receive and support the closed end of the tank.

In another embodiment, a filtration system includes a filter base having inlets and a housing support structure, and a filter housing having a proximal end dimensioned to removably receive the housing support structure. The filtration system also includes filter cartridge disposed within the filter housing to separate a first chamber of the filter housing from a second chamber of the filter housing, and a pump having an inlet in fluid communication with the second chamber. The pump is disposed within the second chamber of the filter housing and includes an outlet connected to a proximal end of an elongated tube. The filtration system further includes a reservoir connected to a distal end of the elongated tube, and an outlet structure is dimensioned to be removably positioned within the second chamber at a distal end of the filter housing. In some aspects, the pump operates to mechanically draw water through the inlets, into the first chamber through an opening in the housing support structure, and across the filter cartridge into the second chamber. The pump also operates to mechanically pump the drawn water through the elongated tube and into the reservoir, and the reservoir discharges the pumped water through the outlet structure.

In certain aspects, the filter base is a circular filter base, and the inlets are disposed at corresponding angular positions along a surface of the circular filter base and are elongated in a radial direction across the surface of the circular filter base. Additionally, in some aspects, the pumped water discharges through the outlet at a flow rate of twenty gallons per hour. In other aspects, the distal end of the filter housing includes a surface oriented perpendicular to an axis of the filter housing, and the outlet structure includes a discharge lip having a curved surface, the curved surface of the discharge lip contacting the surface of the distal end at corresponding discharge locations. In some instances, the pumped water fills the reservoir and discharges across the discharge lip at the corresponding discharge locations.

Additionally, the filter housing is dimensioned to removably receive and support the pump within the second chamber, the pump is disposed at the proximal end of the filter housing. The filter housing is also dimensioned to removably receive and support the filter cartridge. In further aspects, the filter base is dimensioned to be removably positioned over an interior surface of a closed end of the tank, which includes a circumferential groove dimensioned to removably receive and support a circumferential edge of the circular filter base. The pump operates to mechanically draw the water from the tank through the inlets, and the reservoir discharges the pumped water into the tank through the outlet.

These and other embodiments will become apparent to one of skill in the art upon the reading and understanding of the attached figures and associated detailed description.

BRIEF DESCRIPTION OF THE DRAWINGS

The following will be apparent from elements of the figures, which are provided for illustrative purposes and are not necessarily to scale.

FIG. 3 is a plan view of an interior surface of a tank lid, according to certain disclosed embodiments.

FIG. 5 is a perspective view of a reservoir, according to certain disclosed embodiments.

DETAILED DESCRIPTION

This description of the exemplary embodiments is intended to be read in connection with the accompanying drawings, which are to be considered part of the entire written description.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference aquariums and non-disruptive filtration systems, it is to be understood that the discussion is not intended to limit the scope of the present subject matter in any way and that the principles presented are equally applicable to other systems and/or methods for non-disruptive filtration and circulation within aquariums and similar aquatic habitats.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of aquariums and non-disruptive filtration systems are described.

Figure 1:
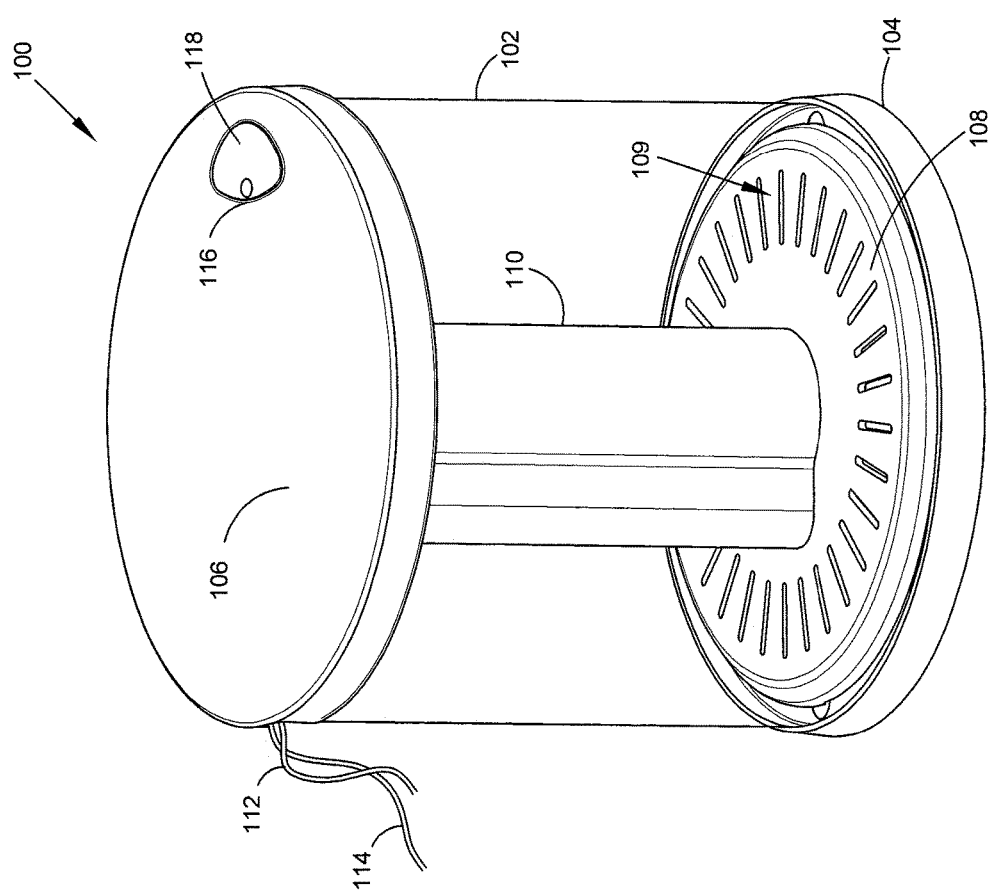
FIG. 1 is a perspective view of an aquarium, according to certain disclosed embodiments.

FIG. 1 is a perspective view of an aquarium 100, according to certain disclosed embodiments. In FIG. 1, aquarium 100 includes a tank 102, a base 104, a lid 106, and a filtration system that includes a filter base 108 and a filter housing 110, and electrical connectors 112 and 114. Lid 106 also includes an aperture 116, which facilitates access to an interior of tank 102 (e.g., to add water and other fluids into the interior of tank 102, etc.), and an aperture cover 118, which may be disposed in an open position or a closed position. In some aspects, tank 100 may be constructed from a transparent material that includes, but is not limited to, glass, acrylic, plastic, or other similar materials. Further, although depicted in FIG. 1 and described herein as a hollow, right-circular cylinder, tank 102 is not limited to this exemplary shape, and in other embodiments, tank 102 may be formed from other shapes (e.g., a cube, a polyhedron, a frustum, a globular shape, etc.), which will necessitate similar shaping for the base 104 and lid 106.

Additionally, as depicted in FIG. 1, filter base 108 is generally circular in shape, and includes a plurality of inlets 109 that facilitate a flow of water through filter base 108. For example, in FIG. 1, inlets 109 are being disposed at corresponding angular positions along a surface of filter base 108, and are elongated in a radial direction across the surface of filter base 108. The disclosed embodiments are not limited to these exemplary inlets and inlet orientations, and in other instances, filter base 108 may include inlets having any additional or alternate shape (e.g., squares, circles, polygons, etc.) or orientation that would facilitate the flow of water through filter base 108. Further, and in some aspects, filter base 108 also includes a housing support structure (not depicted in FIG. 1) that engages filter housing 110 at a proximal end and supports filter housing 110 within tank 102, As described below in greater detail below, filter housing 110 is a hollow, elongated structure dimensioned to removably receive a filter cartridge, a reservoir, and a mechanical pump interconnected to the reservoir through an elongated tube (not depicted in FIG. 1), which collectively function to filter and redistribute water throughout tank 102 in a manner that does not disturb fish and other aquatic life housed within aquarium 100.

Figure 2:
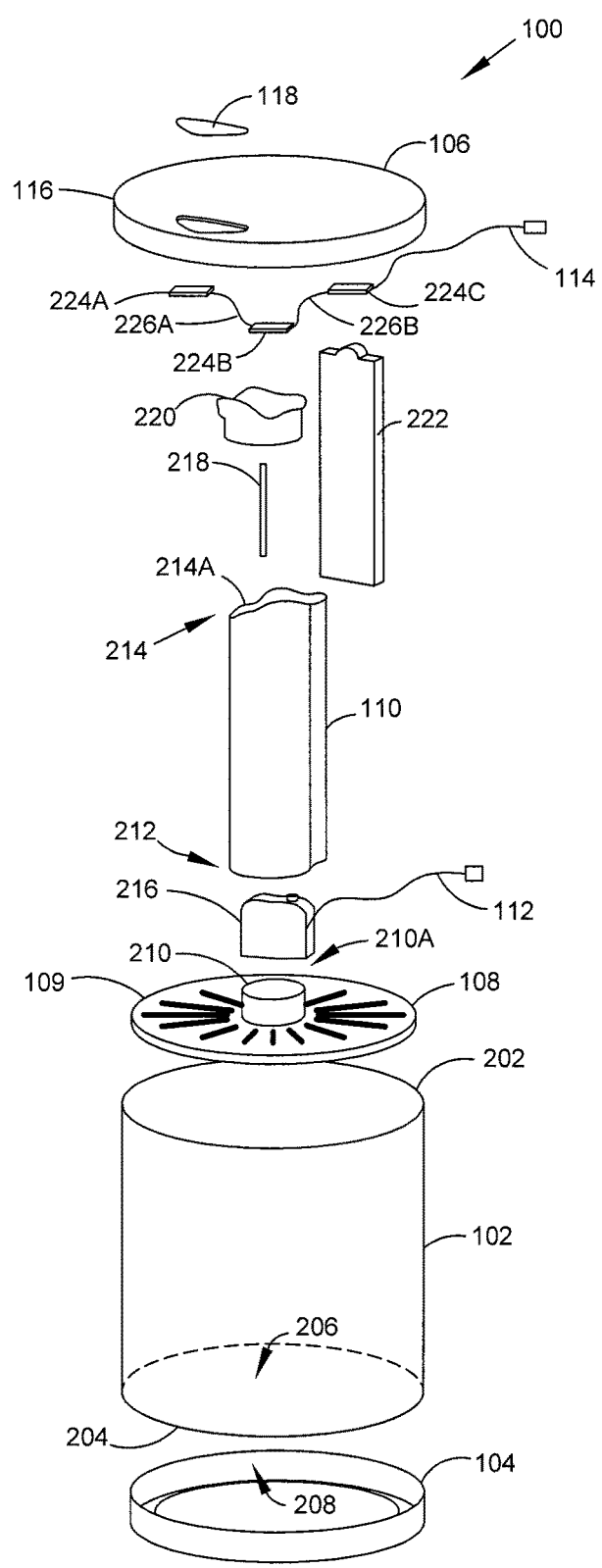
FIG. 2 is an exploded view of an aquarium illustrating a tank, a base and lid, a filter base, a filter housing, a filter cartridge, a pump, a reservoir, and an elongated tube connecting the pump and reservoir, in accordance with certain disclosed embodiments.

As shown in FIG. 2, tank 102 includes an open end 202 and a closed end 204, and an interior surface of closed end 202 establishes a bottom surface 206 of tank 102. In one aspect, base 104 is be dimensioned to receive and support closed end 204. For example, base 104 includes a support lip 208, which may engage a circumferential portion of closed end 204, and closed end 204 may be affixed to lip 208, and to base 104, by an appropriate mechanical fastener or adhesive (e.g., a glue or a resin epoxy). In some aspects, filter base 108 is dimensioned to be removably positioned over bottom surface 206, and includes the housing support structure, e.g., housing support structure 210 of FIG. 2, which engages and is received into a proximal end 212 of filter housing 110. Further, and as described below, housing support structure 210 includes an opening 210A that facilitates fluid communication between an interior of filter housing 110 and tank 102, e.g., through inlets 109 in filter base 108. In some aspects, filter housing 110 is dimensioned to removably receive the mechanical pump (e.g., pump 216 of FIG. 2, which is connected to an external power source by electrical connector 112), the elongated tube (e.g., tube 218 of FIG. 2), the reservoir (e.g., reservoir 220 of FIG. 2), and the filter cartridge (e.g., filter cartridge 222 of FIG. 2).

Additionally, as shown in FIG. 2, filter housing 110 includes a distal surface 214A disposed at a distal end 214 and oriented perpendicular to an axis of tank 102. In certain aspects, described in greater detail below, distal surface 214A may be dimensioned to engage with and support an outlet of reservoir 220 when reservoir 220 is removably positioned within the filter housing.

Aquarium 100 also includes lighting units 224A, 224B, and 224C, which are interconnected by interior electrical connections 226A and 226B. In some aspects, each of lighting units 224A, 224B, and 224C includes a lighting element (not depicted in FIG. 2), such as, but not limited to, a light emitting diode (LED), and is disposed on an interior surface of lid 106 such that light emitted by the corresponding lighting element illuminates the interior of tank 102. FIG. 3 illustrates an exemplary disposition of lighting units 224A, 224B, and 224C, and of electrical connections 226A and 226B, along an interior surface 302 of lid 106 in accordance with certain disclosed embodiments. Aquarium 100 is, however, not limited to this exemplary orientation of lighting units along interior surface 302, and in other embodiments, aquarium 100 may include other number of lighting units and other types of lighting elements (e.g., incandescent or fluorescent lamps) disposed across interior surface 302 (or on other portions of aquarium 100) in any additional or alternate orientation.

Referring to FIG. 3, lid 106 includes a circumferential edge 304 and a lip 306 disposed on interior surface 302 and displaced from circumferential edge 304 by a distance in a radial direction (e.g., by 0.5 cm, 1.0 cm, etc.). Further, a plurality of groove supports 308 are positioned at corresponding angular positions along a portion of interior surface 302 disposed between circumferential edge 304 and lip 306. In one aspect, and described below, circumferential edge 304, lip 306, and groove supports 308 are dimensioned to establish a groove 310 that removably receives and supports open end 202 of tank 102. Additionally, lid 106 includes a pathway 312 formed into circumferential edge 304 and lip 306 to permit a passage of electrical connectors 112 and 114 from an interior of tank to the external source of electrical power.

Figure 4A:
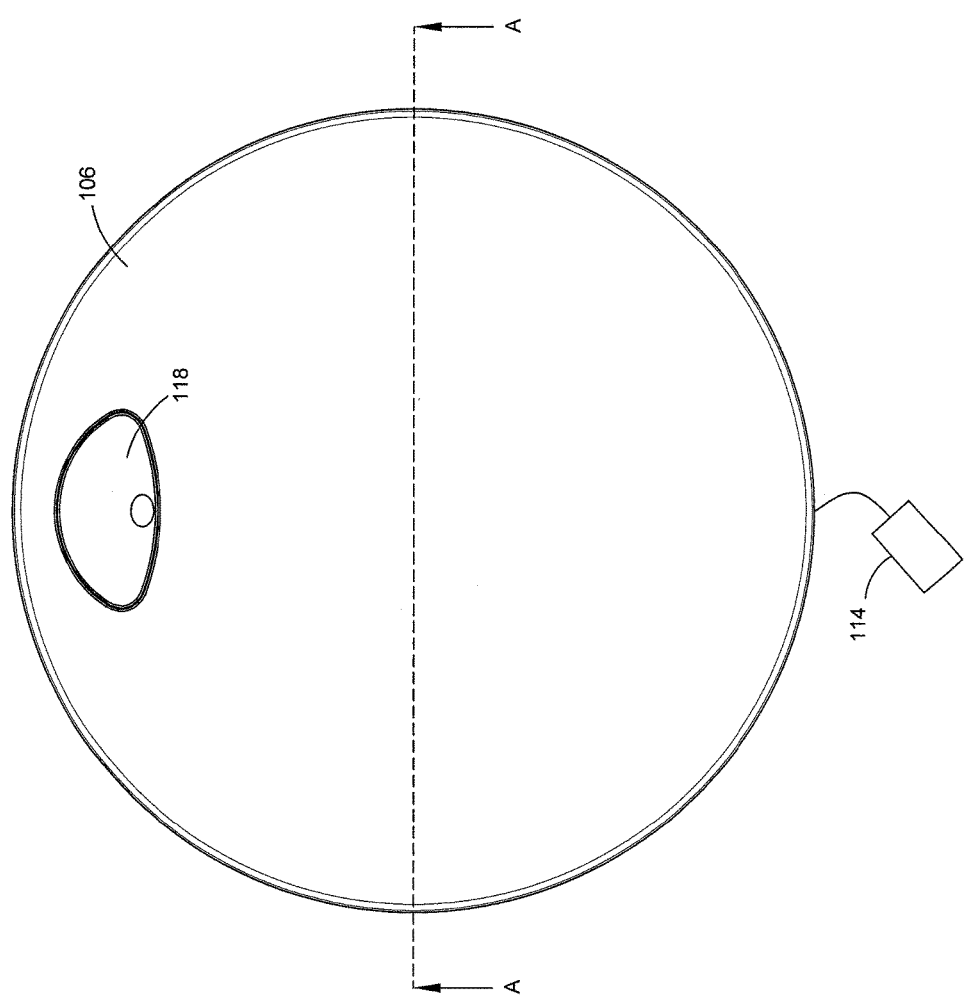
FIG. 4A is a top plan view of an aquarium, according to certain disclosed embodiments.
Figure 4B:
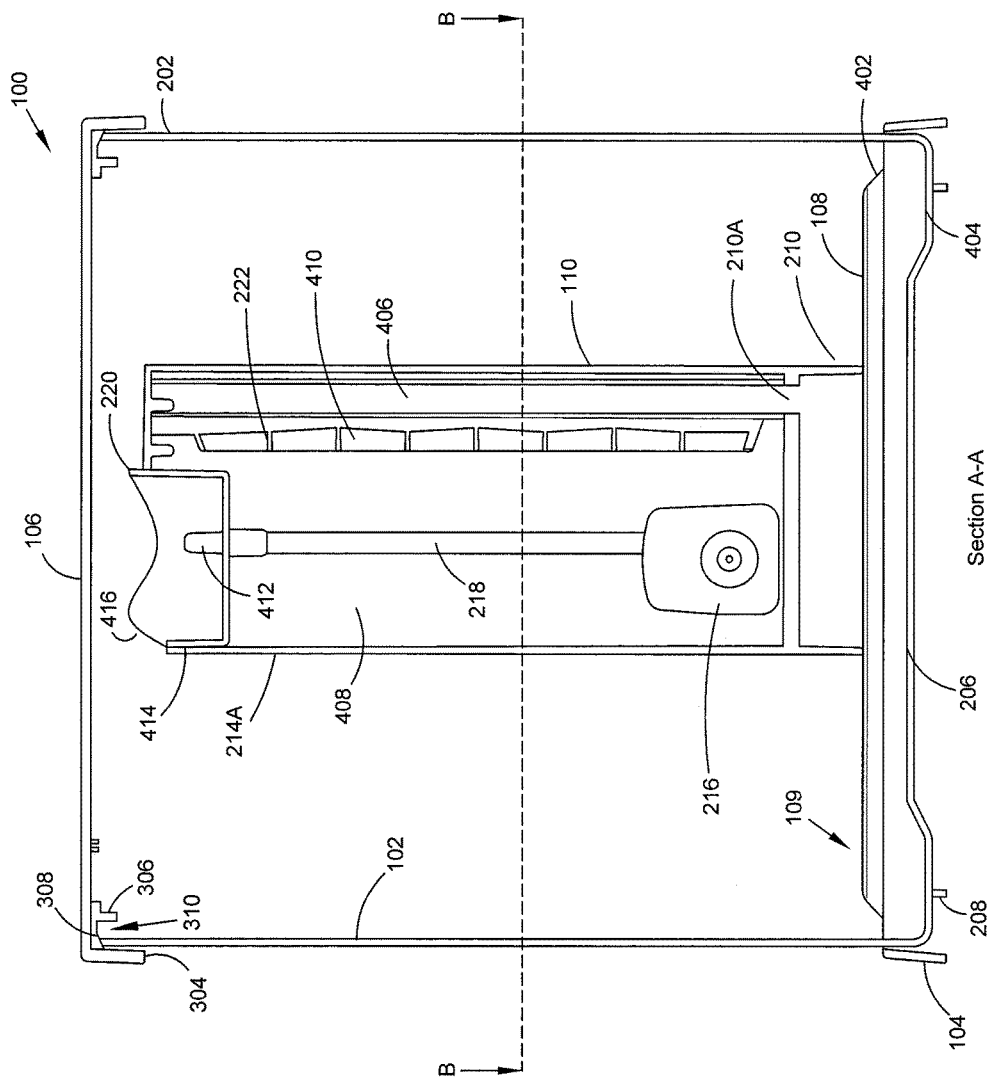
FIGS. 4B and 4C are sectional views of an aquarium, according to certain disclosed embodiments.

As shown in FIGS. 4A and 4B, lid 106 is dimensioned to removably receive open end 202 of tank 102 and to isolate an interior of tank 102 from a surrounding environment (while also facilitating passage of electrical connectors 112 and 114 from the interior of tank 102 through pathway 312 to the external power source). For example, in FIG. 4B, open end 202 of tank 102 may be positioned within groove 310, as established by circumferential edge 304 and lip 306, and may rest upon groove supports 308. In some aspects, groove supports 308 may support lid 106 when removably positioned onto open end 202 of tank 102.

Referring to FIG. 4B, filter base 108 is removably positioned over bottom surface 206 of tank 102, and includes a circumferential lip 402 that engages a surface of a groove 404 formed into closed end 202 of tank 102. In some aspects, the engagement of lip 402 into the surface of groove 404 stabilizes filter base 108 within the interior of tank 102 and limits a movement of filter base 108, and thus, filter housing 110, during operation of pump 216 and usage of aquarium 100. The engagement of lip 402 into the surface of groove 404 also displaces filter base 108 from bottom surface 206, and facilitates, through inlets 109 and opening 210A, fluid communication between the interior of tank 102 and a hollow interior of filter housing 110, as described below.

Figure 4C:
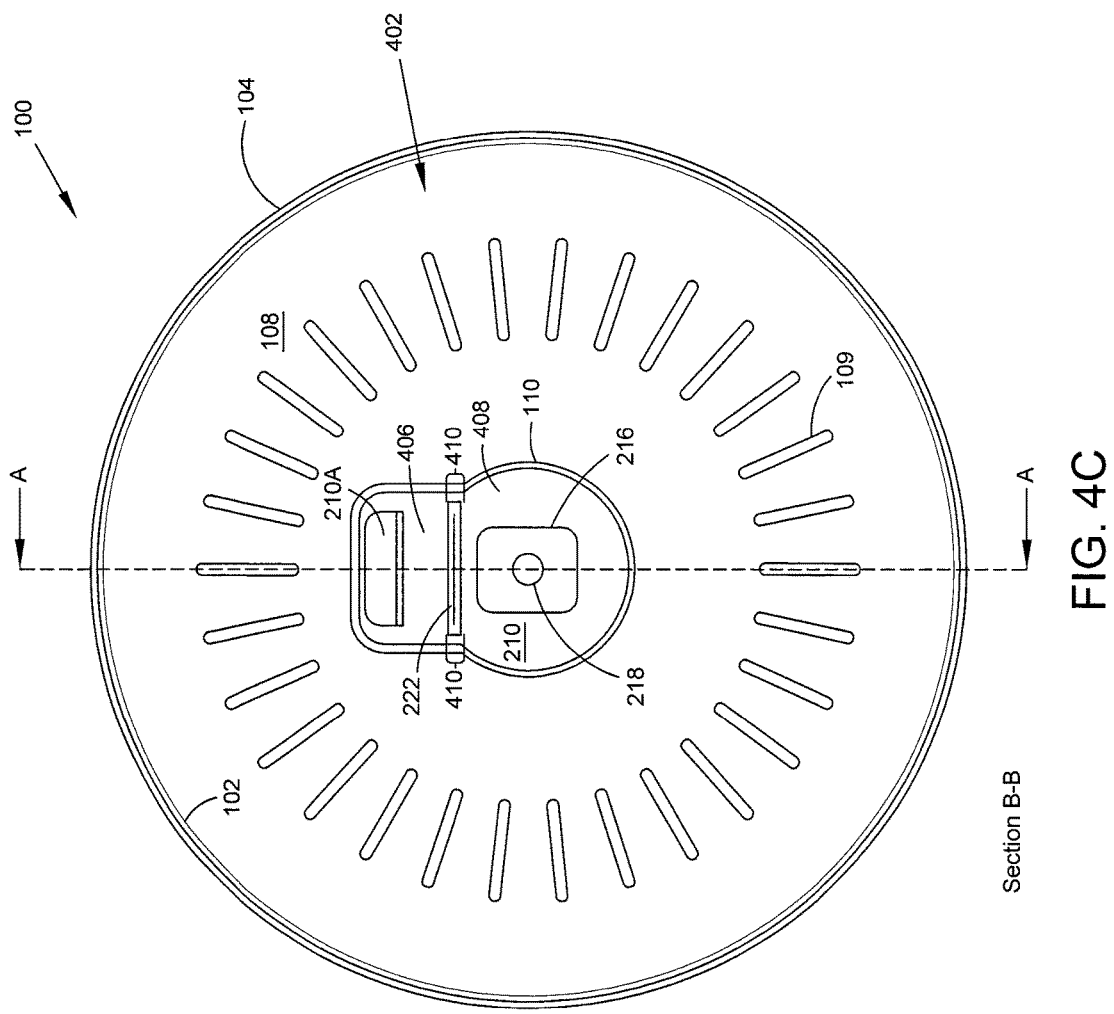

Additionally, as shown in FIGS. 4B and 4C, proximal end 212 (as shown in FIG. 2) of filter housing 110 is dimensioned to removably receive and engage housing support structure 210, which supports and stabilizes filter housing 110 within tank 102 during use of aquarium 100 Filter housing 110 may also be dimensioned to removably receive and support filter cartridge 222, and the positioning of filter cartridge 222 within the hollow interior of filter housing 110 may partition the hollow interior into a first chamber 406 and a second chamber 408 (e.g., as separated by positioned filter cartridge 222). By way of example, filter cartridge 222 may include an elongated, planar base structure surrounded by a natural or synthetic filter material, and filter housing 110 may include filter support structures 410 positioned along an interior surface of filter housing 110 and dimensioned to removably receive and support filter cartridge 222. The disclosed embodiments are, however, not limited these exemplary filter cartridges, and in further aspects, aquarium 100 may include a filter cartridge having another shape, formed from other materials, and/or supported within filter housing 110 by other support structures.

Pump 216 is removably positioned within second chamber 408 at proximal end 212 of filter housing 110, and in some instances, is disposed onto and supported by a portion of housing support structure 210 (e.g., which engaged proximal end 212 of filter housing 110). Although not depicted in FIGS. 4A-4C, pump 216 may be connected to the external power source by electrical connector 112, and may be supported on the portion of housing support structure 210 by one or more non-permanent support structures, which include, but are not limited to, suction cups or adhesives. Pump 216 also includes an input in fluid communication with second chamber 408, and an outlet connected to a proximal end of elongated pipe 218, a distal end of which is connected to an inlet 412 of reservoir 220. As described above, reservoir 220 is dimensioned to be removably positioned within second chamber 408 at distal end 214 of filter housing 110. For example. reservoir 220 includes an outlet structure 414, which is dimensioned to engage distal surface 214A and removably position reservoir 220 within filter housing 110. In certain aspects, described in greater detail below with reference to FIG. 5, outlet structure 414 may include a discharge lip having a curved surface 416, portions of which are in contact with distal surface 214A to discharge water from reservoir 220 into the interior of tank 102.

Referring to FIG. 5, reservoir 220 includes a body portion 502 having a closed end 504, which is connected to elongated tube 218 via inlet 412, and outlet structure 414 is aligned with and affixed onto an open end of body portion 502. Further, in some aspects, outlet structure 414 includes the discharge lip described above, and curved surface 416 may be associated with one or more local maxima, e.g., local maxima 522, 524, and 526, and one or more local minima, e.g., local minima 532 and 534. As shown in FIG. 5, each of local minima 532 and 534 are disposed a first distance above closed end 504 along an axis of reservoir 220, and local maxima 522, 524, and 526 are disposed a second distance above closed end 504 that exceeds the first distance.

In some embodiments, each of local minima 532 and 534 contact distal surface 214A when reservoir 220 is removably positioned within filter housing 110, and each of local minima 532 and 534 establish discharge locations from which outlet structure 414 (e.g., the discharge lip described above) discharges water into the interior of tank 102. For example, tank 102 stores a certain volume of water, and local minima 532 and 534 of curved surface 416 are disposed, along the axis of tank 102, at a position above a surface of the stored water. In certain aspects, and upon connection of pump 216 to the external power source, pump 216 operates to mechanically draw the stored water from the interior of tank 102, through inlets 109, into first chamber 406 of filter housing 110 through opening 210A in housing support structure 210, and across filter cartridge 222 into second chamber 408. Pump 216 further operates to mechanically pump the drawn and filtered water through elongated tube 218 and into reservoir 220 via inlet 412. The pumped water gradually and continuously fills reservoir 220 to a depth consistent with the first distance above closed end 504 (i.e., the axial location of local minima 532 and 534 of outlet structure 414), after which the pumped water discharges from reservoir 220 at the discharge locations established by local minima 532 and 534 of curved surface 416. For example, in some instances, the discharged water may cascade gently from the discharge locations of outlet structure 416 and along outer surface of filter housing 110 and into the tank.

In some instances, outlet structure 414 discharges water through the established discharge locations at a flow rate that is substantially invariable over time. The flow rate includes, for example, a flow rate of twenty gallons per minute, which also corresponds to a rate at which pump 216 operates to mechanically draw and pump stored water into reservoir 220. The disclosed embodiments are, however, not limited to mechanical pumps exhibiting these exemplary flow rates, or to outlet structures and discharge lips characterized by curved surfaces having multiple discharge locations. In additional aspects, aquarium 100 may include mechanical pumps capable of drawing and pumping water at other appropriate flow rates, and outlet structures having other shapes that include other numbers of discharge locations, including an outlet structure having a flat discharge lip without curvature.

The continuous discharge of water from reservoir 220 across the multiple discharge locations (e.g., established the contact between local minima 532 and 534 of curved surface 416 and distal surface 214A) circulates filtered water through tank 102 at a rate sufficient to sustain fish and other aquatic life without establishing a hydrodynamic current within the tank. For example, certain fish, such as betta fish, thrive in low-current aquatic environments, and certain of the disclosed embodiments generate an aquatic environment within aquarium 100 that especially conducive to betta fish and similar aquatic life.

Although examples are illustrated and described herein, embodiments are nevertheless not limited to the details shown, since various modifications and structural changes may be made therein by those of ordinary skill within the scope and range of equivalents of the claims.

We claim:

1. An apparatus, comprising:
a tank having a closed end and an open end;
a filter base dimensioned to be removably positioned over an interior surface of the closed end, the filter base including inlets and a housing support structure;
a filter housing having a proximal end dimensioned to removably receive the housing support structure;
a filter cartridge disposed within the filter housing, the filter cartridge separating a first chamber of the filter housing from a second chamber of the filter housing;
a pump disposed within the second chamber of the filter housing, the pump having an input in fluid communication with the second chamber, and an output connected to a proximal end of an elongated tube; and
a reservoir dimensioned to be removably positioned within the second chamber at a distal end of the filter housing, the reservoir being connected to a distal end of the elongated tube and including an outlet structure, wherein:
the pump operates to mechanically draw water from the tank through the inlets, into the first chamber through an opening in the housing support structure, and across the filter cartridge into the second chamber;
the pump operates to mechanically pump the drawn water through the elongated tube and into the reservoir; and
the reservoir discharges the pumped water into the tank through the outlet structure.

2. The apparatus of claim 1, wherein the tank comprises a cylindrical tank having a circular cross section.

3. The apparatus of claim 2, wherein the filter base comprises a circular filter base, the inlets being disposed at corresponding angular positions along a surface of the circular filter base, and being elongated in a radial direction across the surface of the circular filter base.

4. The apparatus of claim 3, wherein the interior surface of the closed end includes a circumferential groove dimensioned to removably receive and support a circumferential edge of the circular filter base.

5. The apparatus of claim 1, wherein the pumped water discharges through the outlet structure at a constant flow rate.

6. The apparatus of claim 1, wherein the pumped water discharges through the outlet structure at a flow rate of twenty gallons per hour.

7. The apparatus of claim 1, wherein:
the distal end of the filter housing comprises a surface oriented perpendicular to an axis of the tank; and
the outlet structure comprises a discharge lip having a curved surface, the curved surface of the discharge lip contacting the surface of the distal end at corresponding discharge locations.

8. The apparatus of claim 7, wherein the pumped water fills the reservoir and discharges across the discharge lip at the corresponding discharge locations.

9. The apparatus of claim 1, wherein, along the axis of the tank, the discharge lip of the reservoir is disposed at a position above a surface of the stored water.

10. The apparatus of claim 1, wherein:
the filter housing is dimensioned to removably receive and support the pump within the second chamber, the pump being disposed at the proximal end of the filter housing; and
the filter housing is dimensioned to removably receive and support the filter cartridge.

11. The apparatus of claim 1, further comprising a lid dimensioned to removably receive the open end of the tank, the lid comprising an aperture and an aperture cover.

12. The apparatus of claim 11, further comprising a lighting unit disposed on an interior surface of the lid, the lighting unit including a lighting element that emits light illuminating the interior of the tank.

13. The apparatus of claim 1, further comprising a base dimensioned to removably receive and support the closed end of the tank.

14. A filtration system, comprising:
a filter base including inlets and a housing support structure;
a filter housing having a proximal end dimensioned to removably receive the housing support structure;

a filter cartridge disposed within the filter housing, the filter cartridge separating a first chamber of the filter housing from a second chamber of the filter housing;

a pump disposed within the second chamber of the filter housing, the pump having an inlet in fluid communication with the second chamber, and an outlet structure connected to a proximal end of an elongated tube; and a reservoir dimensioned to be removably positioned within the second chamber at a distal end of the filter housing, the reservoir being connected to a distal end of the elongated tube and including an outlet structure, wherein;

the pump operates to mechanically draw water through the inlets, into the first chamber through an opening in the housing support structure, and across the filter cartridge into the second chamber;

the pump operates to mechanically pump the drawn water through the elongated tube and into the reservoir; and the reservoir discharges the pumped water through the outlet structure.

15. The filtration system of claim 14, wherein the filter base comprises a circular filter base, the inlets being disposed at corresponding angular positions along a surface of the circular filter base, and being elongated in a radial direction across the surface of the circular filter base.

16. The filtration system of claim 14, wherein the pumped water discharges through the outlet structure at a flow rate of twenty gallons per hour.

17. The filtration system of claim 14, wherein;

the distal end of the filter housing comprises a surface oriented perpendicular to an axis of the filter housing; and the outlet structure comprises a discharge lip having a curved surface, the curved, surface of the discharge lip contacting the surface of the distal end at corresponding discharge locations.

18. The filtration system of claim 17, wherein the pumped water fills the reservoir and discharges across the discharge lip at the corresponding discharge locations.

19. The filtration system of claim 14, wherein:

the filter housing is dimensioned to removably receive and support the pump within the second chamber, the pump being disposed at the proximal end of the filter housing; and the filter housing is dimensioned to removably receive and support the filter cartridge.

20. The filtration system of claim 14, wherein:

the filter base is dimensioned to be removably positioned over an interior surface of a closed end of the tank;

the interior surface includes a circumferential groove dimensioned to removably receive and support a circumferential edge of the circular filter base;

the pump operates to mechanically draw the water from the tank through the inlets; and the reservoir discharges the pumped water into the tank through the outlet structure.

* * * * *